United States Patent
Klein et al.

(10) Patent No.: US 6,286,110 B1
(45) Date of Patent: Sep. 4, 2001

(54) FAULT-TOLERANT TRANSACTION PROCESSING IN A DISTRIBUTED SYSTEM USING EXPLICIT RESOURCE INFORMATION FOR FAULT DETERMINATION

(75) Inventors: Johannes Klein, San Francisco; Albert C. Gondi, Santa Clara; Sitaram V. Lanka, Mountain View; William J. Carley, San Jose, all of CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/126,632

(22) Filed: Jul. 30, 1998

(51) Int. Cl.[7] ............................ H02H 3/05; H03K 19/003
(52) U.S. Cl. ................................... 714/2; 714/10
(58) Field of Search .................. 714/2, 10, 11, 714/12, 13, 48

(56) References Cited

U.S. PATENT DOCUMENTS

| | | | |
|---|---|---|---|
| 4,751,702 | * | 6/1988 | Beier et al. ............................... 714/13 |
| 4,819,159 | * | 4/1989 | Shipley et al. ........................... 714/19 |
| 5,222,217 | * | 6/1993 | Blount et al. ........................ 707/204 |
| 5,465,328 | * | 11/1995 | Dievendorff et al. ................... 704/15 |
| 5,504,899 | * | 4/1996 | Raz ......................................... 707/10 |
| 5,504,900 | * | 4/1996 | Raz ......................................... 707/10 |
| 5,742,753 | * | 4/1998 | Nordsieck et al. ..................... 714/11 |

* cited by examiner

Primary Examiner—Dieu-Minh Le
(74) Attorney, Agent, or Firm—Leah Sherry; Oppenheimer, Wolff & Donnelly LLP

(57) ABSTRACT

A transaction processing system, including multiple processor units communicatively interconnected, manages information collection by employing a distributed transaction management facility to track and make consistent changes. When each transaction is started, a data structure is created that maintains information concerning the transaction. Included in the data structure is the identity of all processor units having resources involved in the transaction. Should a processor unit fail, and the transaction management facility is notified of that failure, the data structures of all pending transactions will be examined to see if the failed processor unit had a resource that was a participant in the corresponding transaction. If so, the transaction management facility can then make a decision as to whether or not to abort the transaction.

5 Claims, 2 Drawing Sheets

FAULT-TOLERANT TRANSACTION PROCESSING IN A DISTRIBUTED SYSTEM USING EXPLICIT RESOURCE INFORMATION FOR FAULT DETERMINATION

BACKGROUND OF THE INVENTION

The invention relates generally to fault-tolerant transaction processing systems formed from multiple processor units to maintain information collections (e.g., a database), and to from time-to-time modify that collection. More particularly, the invention relates to a method for detecting the loss of a processor unit participating in a transaction that is in the process of changing the state of the information collection maintained by the system.

Concern about protecting and maintaining the integrity of information collections in the face of updates and changes to that information has resulted in the development of a programmatic construct called a transaction. A useful definition of a transaction is that it is an explicitly delimited operation, or set of related operations, that change or otherwise modify the content of the information collection or database from one consistent state to another. Changes are treated as a single unit in that all changes of a transaction are formed and made permanent (the transaction is "committed") or none of the changes are made permanent (i.e., the transaction is "aborted"). If a failure occurs during the execution of a transaction, the transaction can be aborted and whatever partial changes were made to the collection can be undone to leave it in a consistent state.

Typically, transactions are performed under the supervision of a transaction manager facility (TMF). In geographically distributed systems, such as multiple processor unit systems or "clusters" (i.e., a group of independent processor units managed as a single system), each processor unit will have its own TMF component to coordinate transaction operations conducted on that processor unit. The processor unit at which (or on which) a transaction begins is sometimes called the "beginner" processor unit, and the TMF component of that processor unit will operate to coordinate those transactional resources remote from its resident processor unit (i.e., resources managed by other processor units). Those TMF components running on processor units managing resources enlisted in a transaction are "participants" in the transaction. And, it is the TMF component of the beginner processor unit that initiates the steps taken.

Fault tolerance is another important feature of transaction processing. Being able to detect and tolerate faults allows the integrity of the collection being managed by the system to be protected. Although a number of different methods and facilities exist, one particularly effective fault tolerant technique is the "process-pair" technique as it is sometimes called. According to this technique, each process running on each processor unit of a multiple processor system will have a backup process on another processor unit of the system. If a process, or the processor unit upon which the process is running, fails, that failure will bring into operation the backup process to take over the operation of the lost (primary) process. If that failure occurs during a transaction in which the lost process was a participant, the backup will decide whether or not to notify the beginner processor unit to abort the transaction and begin over again. In this way the state of the collection managed by the system remains consistent.

The process-pair paradigm uses what is sometimes called a "Heartbeat" or "I'm Alive" approach to detecting failure of a processor unit. Briefly, according to this approach, each processor unit is required to periodically broadcast an "I'm Alive" message to all other processor units of the system. If the heartbeat message of a particular processor unit has not received its siblings within a predetermined period of time, the silent processor unit is assumed to have failed and all primary processes resident on or associated with the now assumed failed processor unit will be taken over by their backup processes on the other processor units of the system. Each backup process, when taking over, will investigate whether or not it was involved in a transaction, and if so, decide whether or not to abort the transaction. An example of the process-pair concept using "I'm Alive" detection of processor failures can be found in U.S. Pat. No. 4,817,091.

But there are times when a process may not have a back-up process—even though resident in a multiple processor system employing process-pair fault tolerance. If that process is a participant in a transaction, and the processor unit upon which that process runs fails, the TMF component on the beginner processor unit may be aware of the failure and the loss of the processor unit, but not of the participant process. If a modification to be made by the participant process was never made, yet the other participants were able to complete their modifications, the result can severely damage the integrity of the managed collection, i.e., the collection is now inconsistent.

Accordingly, it can be seen that there exists a need for a fault-tolerant method of notifying a transaction manager of the loss of a participant process as a result of the associated processor unit failing, separate and apart from employment of a process-pair fault detection technique.

SUMMARY OF THE INVENTION

Whereas prior implementations of transaction processing systems had available the process-pair paradigm to notify a transaction manager of the loss of a resource participating in a transaction, the present invention provides an alternate approach. The invention provides a simple yet effective facility for allowing a transaction manager to know what processor units of a multiple processor system are participating in a transaction. When the transaction manager is notified of a processor unit failure, a check is made to determine if the failed processor unit has resources that were called upon to participate in any transaction. If so, a decision is made as to whether or not to abort the transaction.

According to the present invention, when a transaction is started on a "beginner" processor unit of a multiple processor system, and there are resources managed by other processor units of the system enlisted to perform work on behalf of the transaction, information identifying each of these other processor units is maintained by the transaction manager. If, before the transaction is completed, a processor unit as having failed, the TMF component on the beginner processor unit will be notified so that it can examine the information. If that examination reveals a transaction that involved resources managed by the failed processor unit, a decision is made whether to abort the transaction.

In an alternate embodiment, the invention is used in association with the process-pair technique (described above); that is, the invention may be employed in a system in which the process-pair technique is used to notify a transaction manager that a participant resource has been lost, yet detect the loss of a participant processor that does not have backup process. According to this embodiment of the invention, if a process that lacks a backup process (and, therefore is not able to use the process pair technique) is enlisted as a participant in a transaction a processor unit of the system other than the beginner processor unit, the identity of that process will be associated with that processor unit on which it is running in the information maintained by the TMF component on that processor unit. And, at the same time, the identity of that processor unit is made known to the TMF component of the beginner processor unit.

A number of advantages are achieved by the present invention. First, the present invention provides a fault-tolerant environment for multi-processor architectures without the addition of a process-pair implementation.

Further, even if process-pair fault-tolerant techniques are employed, those processes that may be too extravagant for a backup process, the present invention provides a technique for permitting such processes to notify a beginner TMF component of its loss.

These and other advantages and aspects of the invention will become apparent to those skilled in this art upon a reading of the following detailed description of the invention, which should be taken in conjunction with the accompanying drawings.

DESCRIPTION OF THE PREFERRED EMBODIMENT

Figure 1:
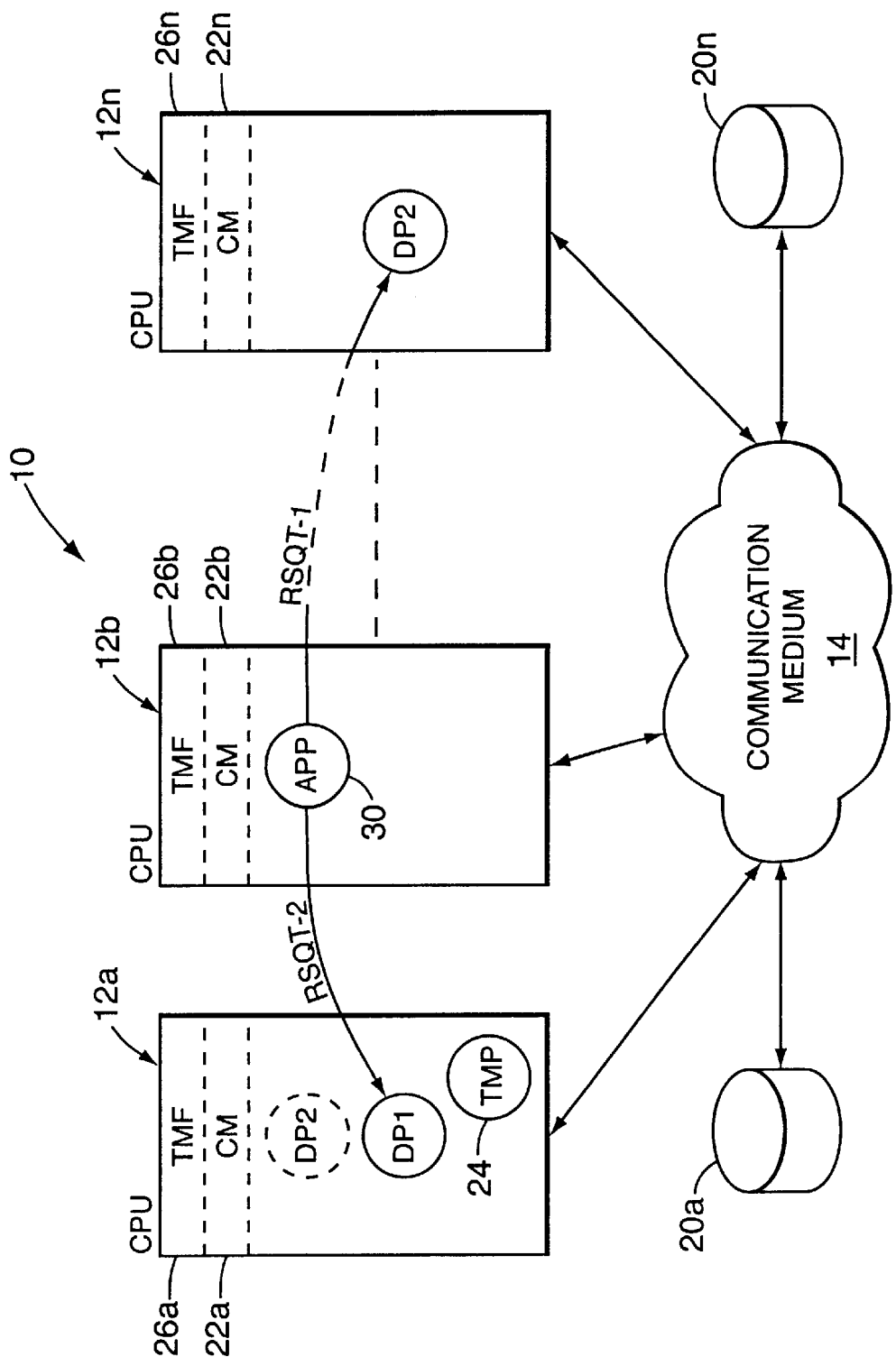
FIG. 1 is an illustrative diagram of a multiple processor cluster or system.
Figure 2:
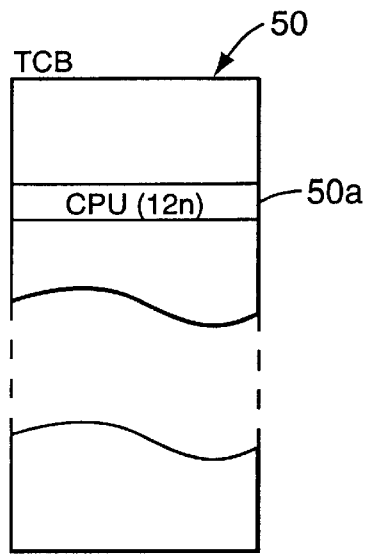
FIG. 2 is an illustration of a transaction control block created for each transaction started on the multiple processor system of FIG. 1, and containing information describing that transaction.

Turning now to the figures, and for the moment specifically FIG. 1, there is shown a multiple processor transaction processing system 10. The transaction processing system 10 is illustrated as comprising a number of central processor units (CPUs) 12 (12a, 12b, . . . , 12n) interconnected by a communication medium or network 14 to allow the CPUs 12, and/or any processes running on those CPUs, to communicate with one another.

As is typical, the transaction processing system 10 will maintain an information collection, usually in the form of a database, effecting changes of the state of that collection in a consistent manner according to a transactional protocol. The persistent form of that database, therefore, is kept on secondary storage represented in FIG. 1 as disk storage units 20 (20a, 20n) "associated" with CPUs 12a and 12n, i.e., the CPUs 12a and 12n have access to the storage units 20, and the controlling processes for those storage units. Here disk processes (DPs) DP1 and DP2 which operate to respond to requests to coordinate data transfers to and from the disk storage units 20, are resident on the corresponding CPU 12a, 12n.

The transaction processing system 10 preferably includes a distributed cluster management system that has parts (cluster manager, CM, components 22a, 22b, . . . , 22n) resident on each of the CPUs 10. One of the responsibilities of each cluster manager component 22 is to perform periodic "I'm Alive" messaging broadcasts to all processing members of the system 10, as described above, generally according to the technique taught in the above-referenced U.S. Pat. No. 4,817,091. Should one of the CPUs fail to send the required "I'm Alive" message, the cluster manager components 22 on all other CPUs 12 will assume the silent CPU has failed, and will notify those backup processes whose primaries may have been resident on the failed CPU.

The transaction processing system 10 also includes the necessary hardware, software, procedures, rules, and users needed to implement and operate a transaction processing application. Accordingly, the transaction processing system 10 will include a distributed transaction manager facility (TMF) comprising a transaction manager process (TMP) 24 resident on one of the CPUs 12 (in FIG. 1, CPU 12a), and TMF components 26 allocated to each individual processor 12 of the system 10; that is, each of the processors 12 will have a TMF component 26 (26a, 26b, . . . , 26n) that operates to manage and track the local resource managers running on that CPU (e.g., DP1 or DP2). When a transaction is started in one CPU 12, that CPU 12 is known as the "beginner" CPU, and the TMF component 26 of that CPU becomes the "beginner" TMF component. If the transaction involves an operation performed on or at a CPU 12 other than the beginner CPU 12, that CPU and its TMF component 26 become "participants" of the transaction and subordinate to the beginner TMF component on the beginner CPU. This may be better understood with an example.

Assume that the CPU 12b is running an application 30 for a banking system whose records (e.g., depositor accounts) form the database (or one of them) maintained on the disk storage systems 20 of the system 10. The application 30 receives an instruction to transfer funds from an account of Jones to an account of Smith. Assume further that the account of Jones is written in a record that resides on the storage system 20n. Since the storage system 12n is associated with the CPU 12n, it is managed by the DP2 process running on the CPU 12n. Assume that the account records of Smith are on storage system 20a associated with CPU 12a where the managing process, DP1, is resident. The application 30 makes a "Start Transaction" call to its local TMF component 26b to register the transaction. The TMF component 26b (now, the beginner TMF component) will, by this call (as is conventional), receive the information it needs to track the transaction so that it can ensure that the transaction completes properly. Thus, a transaction control block (TCB) data structure 50 is created by the beginner TMF component 26b to maintain this information. The application 30 will send a request (RSQT-1) to DP2 process (resident on CPU 12n) to modify the database maintained by the system 10, i.e., the account of Jones by decrementing Jones' account by the amount of the fund transfer. A request (RSQT-2) is similarly sent to the DP1 process to credit the account of Smith by incrementing the account record of Smith, residing on the disk storage 20a (and managed by DP1), by the amount of the transfer. When DP1 and DP2 receive these requests, they will notify their respective TMF components 26 (26a, 26n) that they are participants in the transaction.

When the requests (RSQT-1, RSQT-2) have been sent, the application 30 will then make a "End Transaction" call to the beginner TMF component 26b. The beginner TMF component 26b will perform the necessary operations to make the update permanent and consistent. Preferably, the conventional two-phase commit (presumed abort) protocol is used in which the beginner TMF component 26b broadcasts a "Prepare" signal to all CPUs 12. Those having participants in the transaction—here, DP1 and DP2, will perform as necessary (e.g., completing writes to disk storage) for effecting the change in state of the database and, if the necessary operation succeeds, respond with a "Ready" signal. If all participants of the transaction respond with an affirmative, i.e., a "Ready" signal (and "Not Involved" signals received from any CPUs 12 not participating in the transaction) the beginner TMF component 26b will notify the TMP 24 to "commit" the change to an audit log. The TMP 24 will tell the beginner TMF component 26b that the transaction is committed, and the beginner TMF component 26b then broadcasts a "Commit" signal to the participant CPUs 12. At this point the change is considered permanent.

Suppose, however, that before the transaction is committed (i.e., before it can be made persistent), the CPU 12n fails before DP2 was able to change the portion of the database on the storage system 20n. If the process-pair technique is employed, the backup for the DP2 process, DP2' (running, say, on CPU 12a and shown in phantom) will be notified, by the CM 22a, of the demise of the CPU 12n on which the primary (DP2) was running. DP2' will then attempt to take over the operations of its primary, DP2. The backup, DP2' will see that its primary, DP2, was involved in a transaction, and decide whether or not to abort that transaction, and so notify its TMF component 26a. The TMF component 26a will, in turn, notify the beginner TMF component 26b of that decision. If the decision is to abort the transaction, all changes are rolled back so that the database remains consistent. If, however, the process-pair technique is not employed, for whatever reason, and DP2 does not have a backup, chances are that beginner TMF component 26b will not know that a process involved in an on-going transaction has been lost, and that thereby the integrity of the database is in jeopardy.

This situation forms the problem attacked by the present invention. Assume that a change of state of the information collection maintained by the system 10 is again requested of the application 30 as before. Assume further that, as with the earlier example, the application 30 will enlist the services of DP1 and DP2. However, this time assume that DP2 does not have a backup process and, therefore, is not able to participate in the process-pair fault detection paradigm. Thus, if the CPU 12n hosting DP2 should fail, the transaction most likely will never know, and could complete the transaction without DP2 knowing the outcome, or the transaction knowing whether DP2 was able to complete the task requested of it by the application 30.

Figure 3:
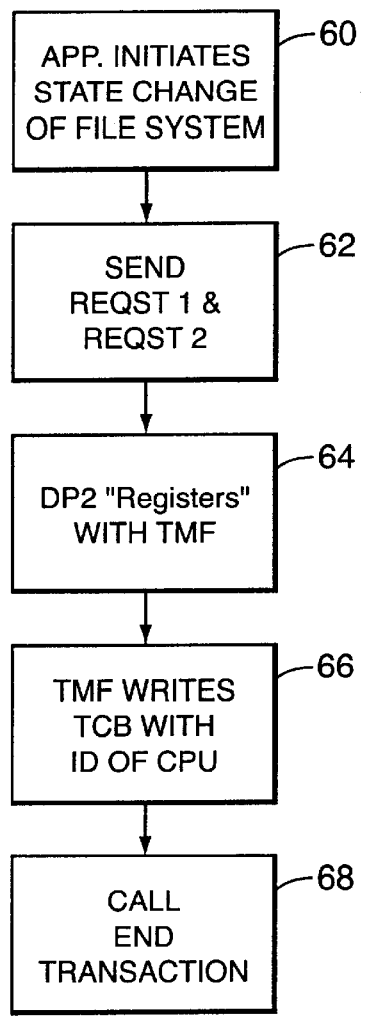
FIG. 3 is a flow diagram of the general steps taken to identify the processors having resources enlisted as participants in a transaction.

Referring now to FIG. 3, there is broadly illustrated the steps taken to implement the transaction, modified according to the present invention. At step 60, as before, the application 30 initiates the transaction to make a change to the information collection (database) maintained by the transaction processing system 10, by a Begin Transaction call to the TMF component 26b (again, making it the "beginner" TMF component). Also as before, the TMF component 26b will create the TCB data structure 50 for the transaction. Since the change requires the assistance of the processes DP1 and DP2 (i.e., storage devices 20a and 20n), the application 30 sends them work requests (RSQT-1, RSQT-2) in step 62.

When that request (RSQT-1) is received by DP2, it is now structured to make a call (TMF_EXPORT) to the TMF component 26n (step 64). The sole function of the TMF_EXPORT call, insofar is relevant here, is to notify the TMF component 26n of that CPU 12n that it hosts a resource that is participating in the transaction. The TMF component 26n will, in turn, notify the beginner TMF component 26b that a resource on CPU 12n is a participant in the related transaction. (Implying, thereby, that the resource has no means of otherwise notifying TMF if it is lost through, for example, failure of CPU 12n.) At step 66, the beginner TMF component 26b will write the TCB data structure 50 for the transaction, at 50a, with information identifying the CPU 12n as being a participant in the transaction.

The RSQT-1 to DP2 will carry with it, in addition to whatever information the DP2 needs to conduct the requested work, the identification of the process and the identity of the beginner CPU, CPU 12b. Similarly, the TMF_EXPORT call provides this same information to the TMF component 26n. In this way, the TMF component 26n knows who to notify that the CPU 12n is participating in the transaction, and which transaction. Similarly, the notified beginner TMF component 26b on the beginner CPU 12b is told what transaction the CPU 12 is a participant, allowing the proper TCB data structure 50 to be marked with the identity of the CPU 12n.

Digressing for the moment, in the example related to FIG. 3, the resource associated with CPU 12a (i.e., storage system 20a, managed by DP1) was also called (by the message RQST-2) to participate in the transaction by the application 30. If, like the process DP2, the process DP1 also did not have a backup, it could also avail itself of a TMF_EXPORT call to its local component, and steps 66 and 68 would be performed also for it. However, if the resource manager DP1 had a backup process on another CPU 12 of the system 10, it could rely upon that backup to inform the beginner TMF component of a loss of CPU 12a and with it the loss of the participant resource manager DP1.

Ultimately, if all goes well the transaction will conclude, as before, with the application 30 will, at step 68, call End Transaction.

Figure 4:
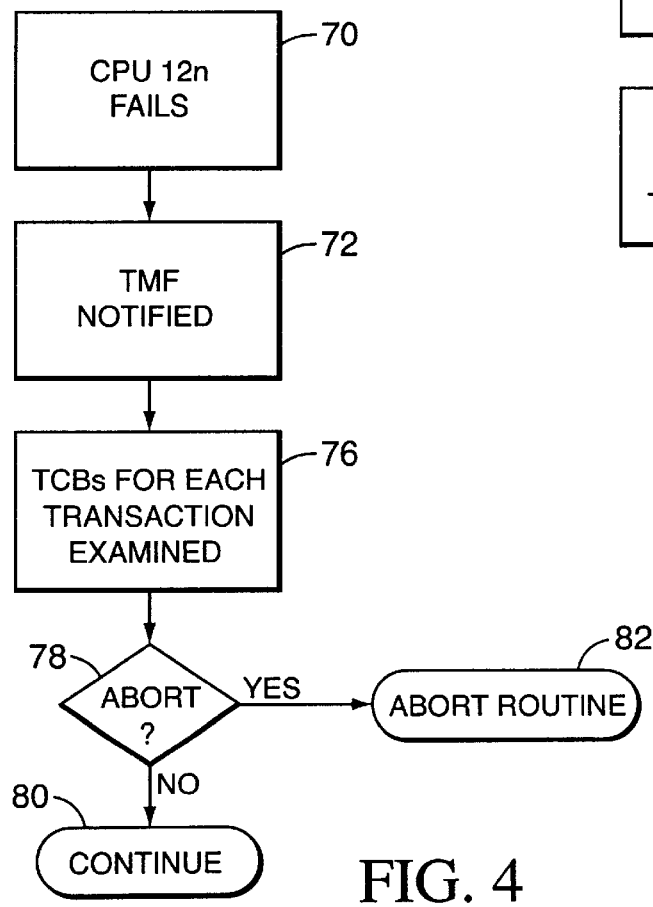
FIG. 4 are the steps taken by a coordinator transaction manager when a failed processor has been detected.

Referring now to FIG. 4, suppose the CPU 12n fails (FIG. 4—step 70). The cluster manager components 22 resident on the CPUs 12 will note the silence of CPU 12n (i.e., no "I'm Alive" message/broadcast from that CPU within a predetermined time) and will assume that the silent CPU 12 has failed. Each cluster manager component 22 will notify the TMF component 26 of the associated CPU 12 (FIG. 4, step 72). The TMF component 26b will, at step 76, then examine each transaction then in progress by examining the TCB 50 maintained for each transaction to see if there are any have entries (e.g., entry 50a) that identify the failed CPU: here, CPU 12n. If so, for that transaction the beginner TMF component 26b will decide, at step 78, whether or not to issue an abort transaction. If not, the transaction(s) using CPU 12n will be allowed to continue (step 80). If an abort is in order, step 78 proceeds to step 82 to perform a conventional abort routine.

Thus, if a transaction employs a resource, in the above example, DP2, not resident on the CPU starting the transaction, and that resource does not have a backup process participating in the process-pair fault-tolerant technique, the present invention operates to be still alert to the loss of that resource so that the transaction can be aborted if need be.

What is claimed is:

1. A method of tracking and controlling data within a computing system in a fault tolerant manner, said computing system having at least two system processor units, the method including the steps of:

starting a transaction at a starting one of said system processor units;

creating an information data structure associated with the transaction;

generating at least one request associated with said transaction within the starting processor unit;

sending the request to at least one working one of the processor units;

marking the information data structure to indicate the working processor units as being participants in the transaction;

detecting a failed one of the working processor units;

reviewing the information data structure to determine if the detected failed working processor unit has received the request, and if so deciding whether to abort the transaction.

2. A method of tracking and controlling data within a system, said system including at least two system CPUs, comprising the steps of:

receiving a transaction in one of said two system CPUs, said transaction being capable of altering said data in said system;

associating with said transaction a control data structure;

sending at least one request associated with said transaction to another of said two system CPUs;

indicating in the control data structure that an other one of said two system CPUs is participating in the transaction;

detecting failure of said other system CPU; and examining the control data structure for the indication, and if found deciding whether to abort the transaction.

3. A method of tracking and controlling data as recited in claim 1 wherein each of the system processor units executes an associated transaction manager facility, and wherein said step of starting a transaction at the starting processor unit further includes registering said transaction via a start transaction call to a beginner transaction manager facility executed by said starting processor unit.

4. A method of tracking and controlling data as recited in claim 1 wherein each of the system processor units executes an associated transaction manager facility, and wherein said request indicates that said starting processor unit is associated with said transaction, and further including the steps of:

in response to requests, notifying the transaction manager facility at a working processor unit that said working processor unit hosts a resource that is participating in said transaction; and notifying the transaction manager facility of said starting system processor unit that said working processor unit hosts a resource that is participating in said transaction.

5. A process of tracking and controlling data in a distributed a computing system using explicit resource information for fault determination, the computing system including a plurality of communicatively intercoupled system processor units each executing an associated transaction manager facility, the process comprising the steps of:

starting a transaction at a beginner one of the processor units;

registering said transaction via a start transaction call to a beginner transaction manager facility executed by said beginner processor unit;

creating an information data structure associated with said transaction;

sending at least one request associated with said transaction to at least one resource executed by an associated working one of the processor units, said request indicating that said beginner processor unit is associated with said transaction;

notifying the transaction manager facility at each said working processor unit that said working processor unit hosts a resource that is participating in said transaction;

notifying said beginner transaction manager facility that said working processor unit hosts a resource that is participating in said transaction;

writing transaction control information to said data structure, said control information indicating that each said working processor unit is a participant in said transaction;

detecting a failed one of the working processor units;

examining the information data structure to determine if said failed working processor unit is a participant in said transaction; and if said failed working processor unit is a participant in said transaction, determining whether to abort said transaction.

* * * * *